United States Patent [19]
Johnson et al.

[11] 4,113,299
[45] Sep. 12, 1978

[54] ROTATING MAGNUS TUBES

[76] Inventors: David W. Johnson, 1884 Sunset Blvd., San Diego, Calif. 92103; Gary C. Johnson, 724 Renconada La., El Paso, Tex. 79922

[21] Appl. No.: 729,195

[22] Filed: Oct. 4, 1976

[51] Int. Cl.² .............................................. B62D 35/00
[52] U.S. Cl. ................................... 296/1 S; 180/1 FV
[58] Field of Search .................. 296/1 S, 91; 180/1 R; 244/206

[56] References Cited
U.S. PATENT DOCUMENTS
2,569,983  10/1951  Favre ..................................... 180/1 R FOREIGN PATENT DOCUMENTS
2,511,700  3/1975  Fed. Rep. of Germany ........... 296/1 S Primary Examiner—Philip Goodman
Attorney, Agent, or Firm—Ralph S. Branscomb

[57] ABSTRACT

The invention comprises magnus tubes mounted adjacent to or imbedded in the orthogonal edges of a vehicle such as a semi-trailer, these tubes preferably being inter-engaged, for concomitant rotation and having a motive force such as a motor to simultaneously drive the tubes to expedite laminar flow of air around the edges of the wall in question as the vehicle moves, it being preferred that the motive force be reversible to invest the magnus tube with an additional braking force.

5 Claims, 7 Drawing Figures

ROTATING MAGNUS TUBES

BACKGROUND OF THE INVENTION

Many land-born vehicles are designed for maximum internal volume coupled with minimum fabrication costs. These vehicles include freight trucks, semi-trailers, moving vans and trailers, as well as campers and the like. As a result of these two design requirements the vehicles have a rectangular or boxlike shape with bluff corners. Consequently, their shape produces a characteristically high aerodynamic drag at highway speeds. In an attempt to reduce this drag, several "add-on" devices have been developed which modify the flow pattern around the bodies and create a more streamlined contour of the vehicle. These add-on devices definitely increase the vehicle's efficiency and reduce the fuel consumption, and one such device is the subject of a patent for which applicant of the instant invention applied dated Mar. 18, 1976, U.S. Ser. No. 668,327. These add-on devices are uniformly passive and immobile in operation, although many of them are adjustable or movable to vary the shape or position prior to or between uses. Clearly, the apparently permanent increase in fuel cost and scarcity has spawned a renewed interest in drag reduction and the development of numerous variations of streamlining fairing structures to meet this need.

SUMMARY OF THE INVENTION

Whereas devices of the prior art are uniformly directed toward the fairing of bluff edges and front faces in an attempt to reduce drag, the present invention is a non-passive drag reduction system utilizing rotating magnus tubes at bluff edges of vehicles to actively aid the flow of air around the vehicle and promote the less retarding laminar flow around the edges rather than the usual turbulent air flow, which is largely responsible for drag.

The magnus tubes may be provided advantageously at the junction edge of any two walls of the vehicle, although the primary drag-producing regions are the edges of the front and rear end walls. The magnus tubes may be freely rotational and activated by the passing air, or they may be interconnected for simultaneous movement and even motor driven. Although it would seem at first blush that motor driven magnus tubes would be counter-productive in that the energy required to drive the tubes would more than compensate for the energy saved in drag reduction, such is not the case, and even should the tubes be directly wind driven as by an anemometer, because of a "leverage" effect, energy saving is substantial.

As is disclosed in more detail hereinafter, the magnus tubes may be mounted in several different ways, with or without fairing elements, to existing or modified vehicles' structures, and to numerous ones of the edges of the vehicle, and an additional advantage is provided by the ability to reverse the motive power causing the tubes to revolve in the opposite direction and increase drag over what it would be without the tubes. This provides a braking effect which is especially valuable because it is proportional in effectiveness to the speed at which the vehicle is traveling. Because the braking is independent of the type and condition of the road surface, it provides a valuable adjunct to surface braking, especially in wet or icy weather conditions.

DETAILED DESCRIPTION OF THE PREFERRED EMBODIMENTS

Figure 1:
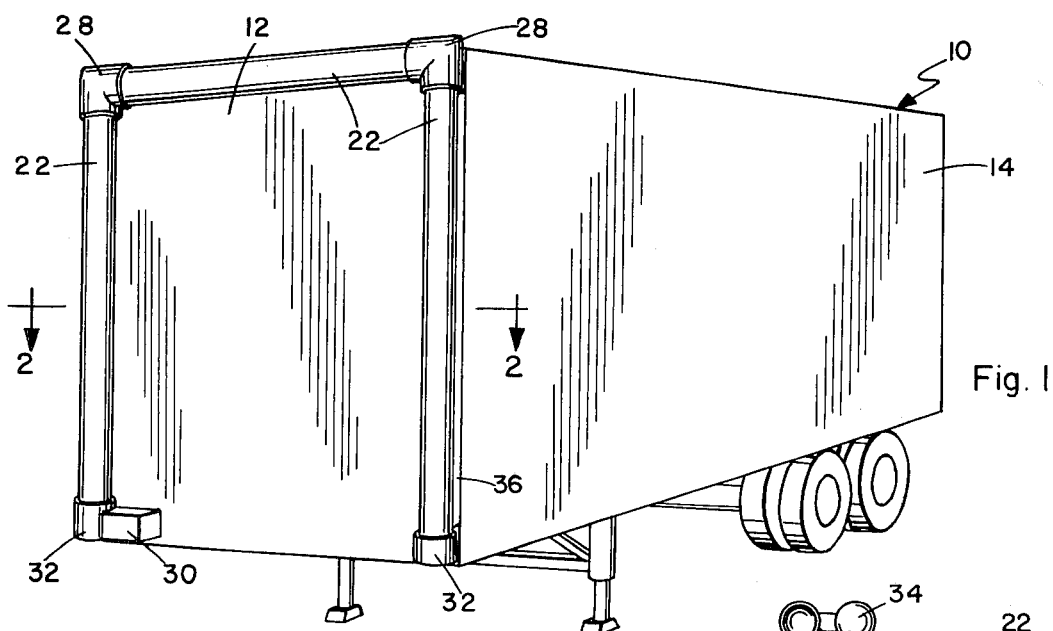
FIG. 1 is a perspective view of a typical trailer vehicle incorporating the rotating cylinders.

The invention is shown as being mounted on a freight trailer 10 although clearly the applicability is not thus limited and any vehicle having one or more bluff faces could benefit by using the invention. The trailer has a front end wall 12, two sidewalls 14, rear wall 16, and top and bottom walls 18 and 20, such that all the walls together define a substantially rectangular box which maximizes the internal carrying space but also typically produces a vehicle with considerable drag.

Figure 2:
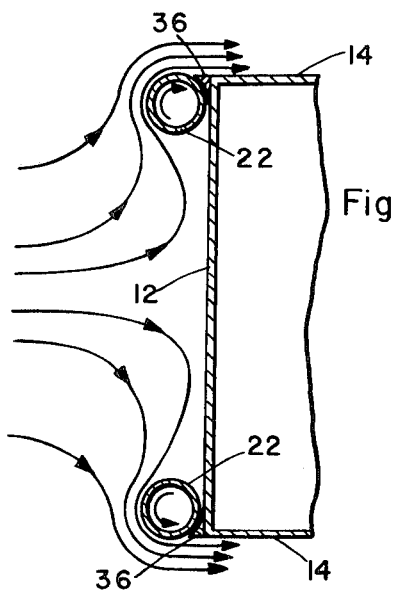
FIG. 2 is a sectional view taken on line 2 — 2 of FIG. 1 and showing the air flow.

The invention includes magnus tubes 22 which are three in number in the first embodiment, which is illustrated in FIGS. 1 and 2. These tubes are somewhat diagrammatically illustrated and are disposed adjacent the front end-wall 12 of the trailer body and although their positioning obviously is subject to some variation, as shown in FIG. 2, the tubes are so mounted that their outer wall is approximately tangential with the extended plane defined by the side walls and top wall 14 and 18. The magnus tubes are hollow and light in weight and are mounted in any suitable fashion so that they will rotate in a low friction manner.

Although it is possible that each tube be made freely rotatable and unattached to other structure, in the preferred embodiment the three magnus tubes 22 on the front end wall 12 are linked together for concomitant rotation as by bevel gears 24 which are rigidly mounted to the tubes 22 and are shown as being journelled for convenience in end plates 26, which are in turn mounted to the front wall 12. The bevel gears are exemplary and could be replaced by equivalent structure to effect the 90° torque transmission, and where two tubes meet, as at the upper right and left-hand corner of the face, a fairing housing 28 is used to act as a sheath both to protect the internal mechanism and reduce wind resistance at the corners.

FIG. 1 illustrates a box 30 connected to one of two base mountings 32, this box representing a diagrammatic illustration of an electric motor or other motive force used to drive all three of the magnus tubes such that they rotate in the direction indicated by the curved arrows in FIG. 2 to produce a laminar wind flow, also shown by arrows in FIG. 2. As mentioned above, because there is no direct relationship between the energy required to rotate the magnus tubes and the energy saved by their presence, the use of the magnus tubes does not result in a negative energy trade-off.

Figure 3:
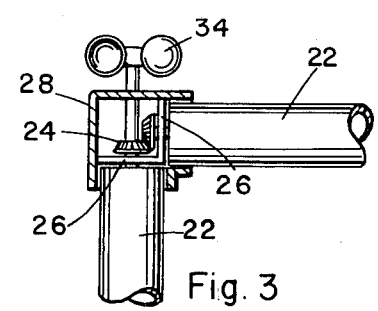
FIG. 3 is an enlarged view, partially cut away, of a corner drive connection, and showing an alternative wind powered drive.

Al alternative means of driving the magnus tubes is shown in FIG. 3 as an anemometer 34 and is included more to illustrate the principle that any means of propulsion could be incorporated to drive the magnus tubes rather than because the anemometer itself may be an ideal method of providing power. However, the anemometer does represent the quite feasible technique of driving the magnus tubes by passing air. Ideally, the rotational velocity of the tubes should be proportional to vehicle speed, which is approximated by the wind powered version and could be achieved alternatively by driving the tubes from the vehicle drive train.

In the embodiment represented in FIG. 2 wherein the magnus tubes are disposed forward of and adjacent to the front wall 12 of the trailer, if the tubes are mounted on a trailer which has not been designed for use with the tubes, it may be desirable to utilize wedge fairings 36 which define extensions of the planes of the side walls and have concave faces to complement the contours of the magnus tubes. The presence of these wedge fairings of course enhance the ability of the magnus tubes to create and maintain laminar flow rather than engaging passing air in a series of vortices.

An advantage inherent in the utilization of an electric motor 30 or the like resides in the ability to reverse the motor such that the magnus tubes would actually have a braking effect. Although clearly reversing the motor will not cause the vehicle with its trailer to come to a screeching halt, it will exert a definite braking force which is independent of the road surface and thus would be advantageous in adverse weather conditions.

Figure 5:
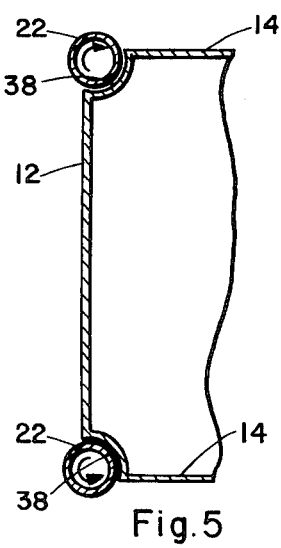
FIG. 5 is a sectional view similar to FIG. 2 showing recessed cylinders.

In an alternative manner of mounting the tubes shown in FIG. 5, the junction edge between the front end wall and side walls is hollowed as at 38 to define a shoe-like recess in the edges of the trailer such that the magnus tubes can seat in these recesses and the front end wall and side walls in effect become fairing members acting in concert with the magnus tubes. This, of course, would have to be done during the manufacture of the vehicle, but aside from not having an add-on capability would probably provide the most satisfactory aerodynamic surface for the front of the trailer.

Figure 4:
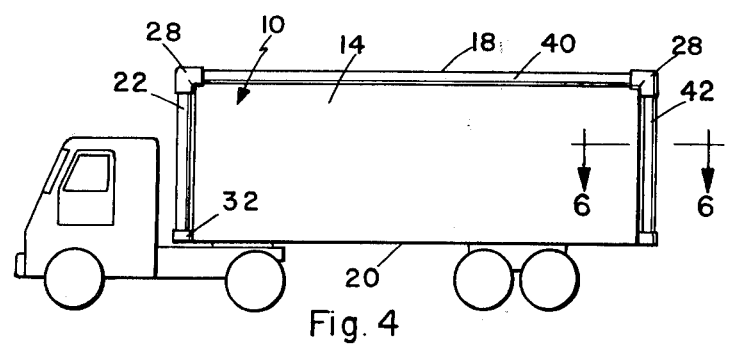
FIG. 4 is a side elevational view of a vehicle with front, top and rear rotating cylinders.

Although as thus described the magnus tubes have been shown only on the front of the vehicle, as can be seen in FIG. 4, horizontally extended tubes 40 can be mounted along the top edges of the vehicle to reduce resistance to crosswinds. Although drag factors are generally thought of as involving the front face primarily and the rear surface secondarily, in fact, side winds can represent considerable drag producing factors. It would probably be desirable to control the rotation of these tubes 40 so that they are operative only during the existence of crosswinds and so that they may be reversed to accommodate reversed crosswinds.

Figure 6:
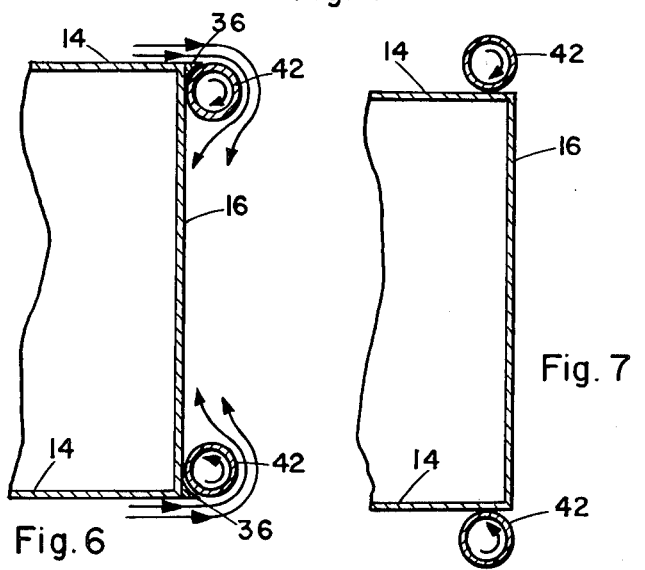
FIG. 6 is an enlarged sectional view taken on line 6 — 6 of FIG. 4.
Figure 7:
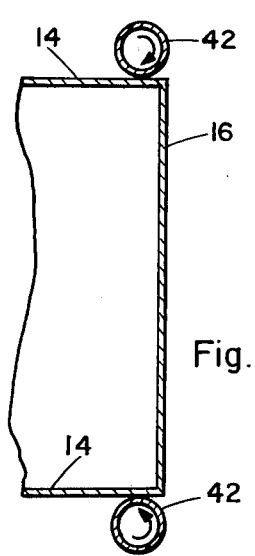
FIG. 7 is a similar sectional view showing an alternative position for the rear cylinders.

Turning to the magnus tubes 42, which are mounted at the rear of the vehicle, two alternative locations of attachment of these tubes are shown. FIG. 6 illustrates the counterpart to FIG. 2 incorporating wedge fairings 36 identical to those used in the front end mounted tubes, and as can be seen by the arrows the existence of the rear tubes will enhance the laminar characteristic of the flow at the rear of the trailer as well as at the front. FIG. 7 utilizes side-mounted tubes which have the advantage of leaving the rear end wall of the trailer free so that doors may be opened to load and unload cargo, although it is doubtful that these laterally mounted magnus tubes would be equally effective as those shown if FIGS. 2, 5, and 6 in reducing drag. Of course, all of the relative positions indicated can be used at any edge so that, for example, the mounting of FIG. 5 is not limited to the front end wall of the trailer.

The invention as disclosed and claimed herein represents a unique approach to drag reduction in moving vehicles and will produce results over and above those experienced by use of static fairing devices. It may be found to be advantageous in any particular application to utilize one or more of the tubes in any or all of the positions indicated in the Figures herewith.

The invention claimed is:

1. On a vehicle having a bluff face end wall producing resistance to air having a velocity component orthogonal to said bluff face, an air resistance reduction mechanism comprising:
   (a) a cylindrical tube parallel and adjacent to an edge of said bluff face;
   (b) means rotationally mounting said cylindrical tube on said vehicle; and
   (c) a motor for driving said tube such that the flow of air thereover is expedited to reduce drag, said motor being reversible to cause said tube to spin in the opposite direction to increase drag to augment the braking capability of the vehicle.

2. Structure according to claim 1 wherein said end wall has three orthogonally related contiguous walls and including three cylindrical tubes adjacent said sidewalls and substantially tangential to the extended plane of said end wall.

3. Structure according to claim 1 and including two further tubes rotationally mounted on said vehicle similarly to the first mentioned tube, all three of said tubes having linkage means interconnecting same for concomitant rotation.

4. Structure according to claim 1 wherein said end wall has an adjoining orthogonally related side wall and said cylindrical tube in adjacent said end wall and is substantially tangential to the projected plane of said side wall, and including a fairing member extending from said end wall and continuing the plane of said side wall adjacent said tube.

5. On a vehicle having an end wall and four orthogonally related side walls defining top and contiguous side edges with said end wall, an air resistance reduction mechanism comprising:
   (a) three cylindrical tubes rotationally mounted on said vehicle parallel and adjacent to said top and side contiguous edges, respectively;
   (b) linkage means interconnecting said tubes for concomitant rotation;
   (c) a motor for rotationally driving said tubes, said motor being mechanically powered from the drive train of said vehicle such that the rotational velocity of said tube is proportional to vehicle speed.

* * * * *